(12) United States Patent
Shimada et al.

(10) Patent No.: US 7,283,786 B2
(45) Date of Patent: Oct. 16, 2007

(54) RADIO RELAY APPARATUS, METHOD OF DETERMINING IDENTIFICATION CODE THEREOF, AND MONITORING APPARATUS

(75) Inventors: Naoto Shimada, Yokosuka (JP); Shiro Takenouchi, Funabashi (JP)

(73) Assignee: NTT DoCoMo, Inc., Tokyo (JP)

( * ) Notice: Subject to any disclaimer, the term of this patent is extended or adjusted under 35 U.S.C. 154(b) by 609 days.

(21) Appl. No.: 10/622,487

(22) Filed: Jul. 21, 2003

(65) Prior Publication Data
US 2004/0106373 A1 Jun. 3, 2004

(30) Foreign Application Priority Data
Jul. 22, 2002 (JP) ............................ 2002-212881

(51) Int. Cl.
*H04B 1/60* (2006.01)
(52) U.S. Cl. ............................ 455/9; 455/16
(58) Field of Classification Search ............... 455/7–25
See application file for complete search history.

(56) References Cited

U.S. PATENT DOCUMENTS
6,571,284 B1 * 5/2003 Suonvieri ................. 455/7 X

FOREIGN PATENT DOCUMENTS

| | | |
|---|---|---|
| JP | 2-4047 | 1/1990 |
| JP | 10-93496 | 4/1998 |
| JP | 2001-128208 | 5/2001 |
| JP | 2001-320754 | 11/2001 |
| WO | WO96/22636 | 7/1996 |
| WO | WO98/29962 | 7/1998 |

* cited by examiner

*Primary Examiner*—Philip J. Sobutka
(74) *Attorney, Agent, or Firm*—Oblon, Spivak, McClelland, Maier & Neustadt, P.C.

(57) ABSTRACT

A radio relay apparatus, a monitoring apparatus, and a method of determining an identification code of the radio relay apparatus enabling rapid formation of a radio communication area. The radio relay apparatus receives the base station identification code from a base station, determines a temporary identification code based on the received base station identification code, and transmits the temporary identification code to the monitoring apparatus. When the received temporary identification code is different from the formal identification codes of other radio relay apparatuses, the monitoring apparatus transmits directly the temporary identification code to the radio relay apparatus; when the received temporary identification code is the same as the formal identification code of a radio relay apparatus, the monitoring apparatus determines an identification code different from the temporary identification code and transmits the determined identification code to the radio relay apparatus. The radio relay apparatus determines the received identification code as a formal identification code of the radio relay apparatus. Then, the radio relay apparatus starts operations using the formal identification code.

7 Claims, 5 Drawing Sheets

RADIO RELAY APPARATUS, METHOD OF DETERMINING IDENTIFICATION CODE THEREOF, AND MONITORING APPARATUS

BACKGROUND OF THE INVENTION

1. Field of the Invention

The present invention relates to a radio relay apparatus for relaying communications between a base station and a mobile station in a mobile communication system, a monitoring apparatus for monitoring a mobile communication system, and a method of determining an identification code of the radio relay apparatus.

2. Description of the Related Art

In a mobile communication system, a base station communicates with mobile stations located in a cell covered by the base station. However, even within a single cell, there may be places not suitable for direct radio communication because of shielding due to buildings or other reasons, so that signals from the base station can hardly reach the mobile stations at these places. For this reason, radio relay apparatuses are installed to relay the radio communications between the base station and the mobile stations.

In addition, a monitoring apparatus for monitoring the radio relay apparatuses may be installed in a mobile communication system. Each of the radio relay apparatuses transmits information required for monitoring to the monitoring apparatus. In order for the monitoring apparatus to identify the source of transmission of the monitoring information, each of the radio relay apparatuses transmits the monitoring information with an identification code included therein.

The identification code of a radio relay apparatus is determined in the following way. When a radio relay apparatus is newly installed, a maintainer specifies a base station according to its location as the target to be relayed to/from by the radio relay apparatus. Then, in conjunction with an identification code of the specified base station, the maintainer determines an identification code of the radio relay apparatus and writes the determined identification code to the radio relay apparatus. By the making of the identification code of the radio relay apparatus in conjunction with the identification code of the base station, the base station is enabled to determine all the call areas covered by itself by using the identification codes of the radio relay apparatuses.

When problems occur in a base station, or a base station is newly installed, the target of relay of a radio relay apparatus changes. In this case, the maintainer specifies another base station as the new target of relay, and in a similar way, the maintainer determines an identification code of each radio relay apparatus in conjunction with the identification code of the newly specified base station, and then writes the determined identification code to the radio relay apparatus.

As described above, in the related art, each time a radio relay apparatus or a base station is newly installed, the target of relay of a radio relay apparatus changes, the maintainer has to go through the above procedure, that is, searching for a base station that is to be the new target of relay, determining an identification code of each radio relay apparatus in conjunction with the identification code of the newly specified base station, and writing the determined identification code to the radio relay apparatus. This operation is cumbersome, and may result in mistakes because it is performed manually. As a result, it usually time consuming to start operations of a radio relay apparatus, and radio communication areas cannot be formed quickly.

SUMMARY OF THE INVENTION

Accordingly, it is a general object of the present invention to solve the above problems of the related art.

A more specific object of the present invention is to provide a radio relay apparatus, a monitoring apparatus, and a method of determining an identification code of the radio relay apparatus enabling quick formation of a radio communication area.

To attain the above object, according to a first aspect of the present invention, there is provided a radio relay apparatus for relaying communications between a base station and a mobile station and transmitting monitoring information including a formal identification code thereof to a monitoring apparatus in a mobile communication system, comprising a determination unit configured to determine a first identification code used as a temporary identification code of the radio relay apparatus, said first identification code being determined in conjunction with an identification code of the base station that serves as a target to be relayed to/from by the radio relay apparatus; and a receiver configured to receive a second identification code determined by the monitoring apparatus, said monitoring apparatus determining the second identification code based on the first identification code, said second identification code being determined to be different from identification codes of other radio relay apparatuses, wherein the second identification code is used as the formal identification code of the radio relay apparatus.

Preferably, in the radio relay apparatus, the determination unit combines a part of the identification code of the base station and a characteristic code of the radio relay apparatus, and uses the combined code as the first identification code.

Preferably, the radio relay apparatus further comprising a modification determination unit configured to determine whether the formal identification code of the radio relay apparatus needs to be modified, wherein when the modification determination unit determines that the formal identification code of the radio relay apparatus needs to be modified, the determination unit determines the first identification code used as the temporary identification code of the radio relay apparatus on the basis of an identification code of another base station.

Preferably, the radio relay apparatus further comprising a transmitter configured to transmit the monitoring information including the formal identification code of the radio relay apparatus to the monitoring apparatus.

To attain the above object, according to a second aspect of the present invention, there is provided a monitoring apparatus for monitoring a mobile communication system including a base station, a mobile station, and a radio relay apparatus for relaying communications between the base station and the mobile station, comprising a receiver configured to receive a first identification code from the radio relay apparatus used as a temporary identification code of the radio relay apparatus; a determination unit configured to determine a second identification code used as a formal identification code of the radio relay apparatus; and a transmitter configured to transmit the formal identification code to the radio relay apparatus.

Preferably, in the monitoring apparatus, the determination unit determines the second identification code that is different from formal identification codes of other radio relay apparatuses.

To attain the above object, according to a third aspect of the present invention, there is provided a method of determining a formal identification code of a radio relay apparatus in a mobile communication system including the radio relay apparatus for relaying communications between a base station and a mobile station, and a monitoring apparatus for monitoring the mobile communication system by using monitoring information including the formal identification code of the radio relay apparatus, comprising the steps of determining, by the radio relay apparatus, a first identification code used as a temporary identification code of the radio relay apparatus in conjunction with an identification code of the base station serving as a target to be relayed to/from; and determining, by the monitoring apparatus, a second identification code based on the first identification code, said second identification code being determined to be different from formal identification codes of other radio relay apparatuses, and the radio relay apparatus using the second identification code as the formal identification code thereof.

According to the present invention, based on an identification code received from the base station that serves as a target to be relayed to/from, the radio relay apparatus determines a first identification code used as a temporary identification code thereof, and transmits the temporary identification code to the monitoring apparatus. The monitoring apparatus determines a second identification code different from identification codes of any other radio relay apparatuses. The radio relay apparatus receives the second identification code from the monitoring apparatus, and uses the second identification code as the formal identification code thereof. In this way, the maintainer does not need to perform cumbersome operations, and the time required for starting operations of the radio relay apparatus can be shortened, and radio communication areas can be formed quickly.

These and other objects, features, and advantages of the present invention will be more apparent from the following detailed description of the preferred embodiments given with reference to the accompanying drawings.

BRIEF DESCRIPTION OF THE DRAWINGS

FIG. 4 is a flow chart showing the operation of a newly installed radio relay apparatus when its power is turned ON;

FIG. 6 is a flow chart showing the operations of the radio relay apparatus when the radio relay apparatus is out of synchronization with the base station serving as the target to be relayed to/from.

DESCRIPTION OF THE PREFERRED EMBODIMENTS

Below, preferred embodiments of the present invention are explained with reference to the accompanying drawings.

Figure 1:
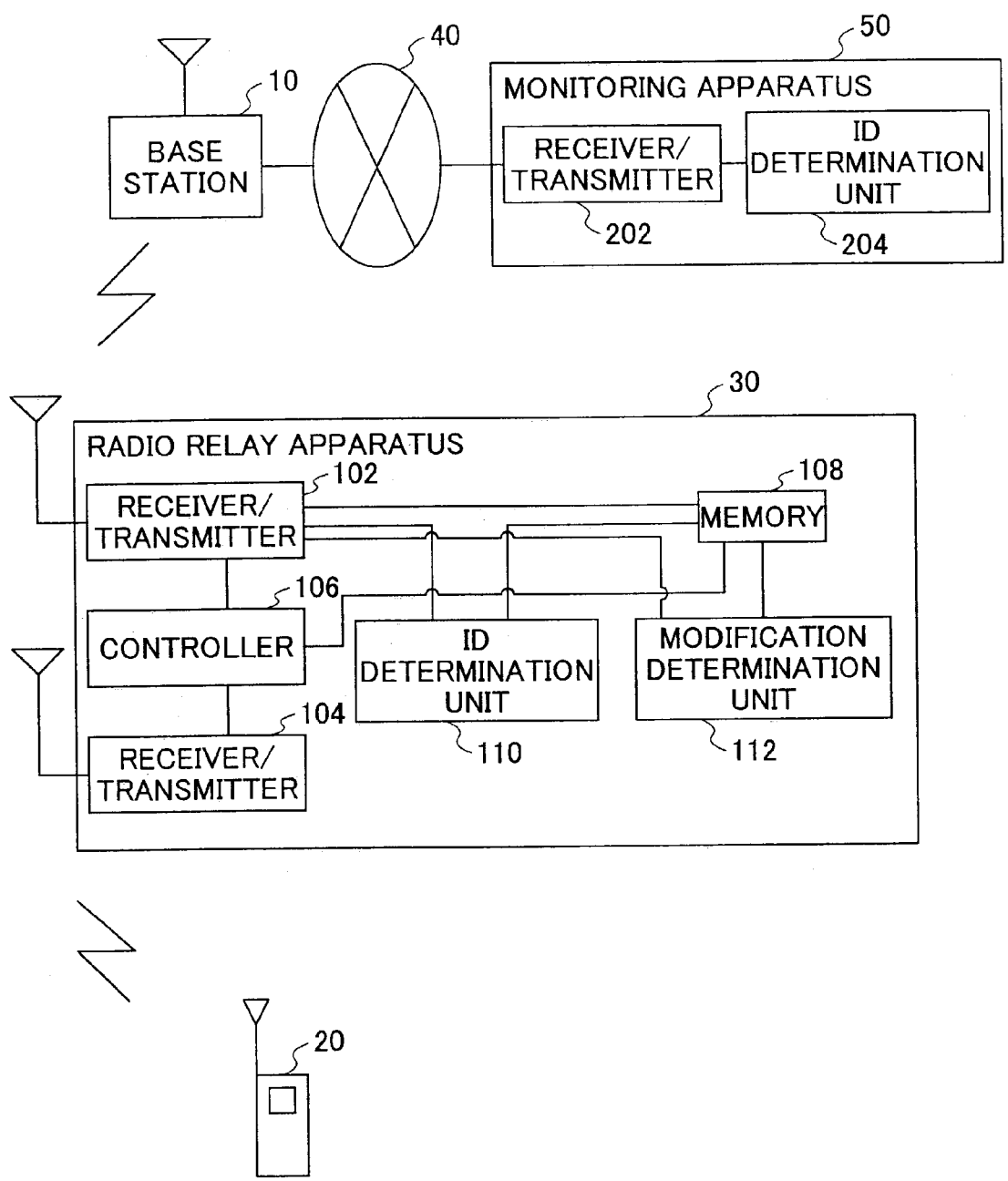
FIG. 1 is a view showing an example of a configuration of a radio communication system according to an embodiment of the present invention.

FIG. 1 is a view showing an example of a configuration of a radio communication system according to an embodiment of the present invention. The radio communication system in FIG. 1, for example, is a PHS (Personal Handyphone System) communication system, including a base station 10, a mobile station 20, a radio relay apparatus 30, a communication network 40, and a monitoring apparatus 50.

The radio relay apparatus 30 relays the communications between the base station 10 and the mobile station 20. The radio relay apparatus 30 includes receivers/transmitters 102 and 104, a communication controller 106, a memory 108, a determination unit 110 for determining the identification code of the radio relay apparatus 30, and a modification determination unit 112.

The receiver/transmitter 102 communicates with the base station 10, while the receiver/transmitter 104 communicates with the mobile station 20. The communication controller 106 outputs the signals received by the receiver/transmitter 102 from the base station 10 to the receiver/transmitter 104, and the signals received by the receiver/transmitter 104 from the mobile station 20 to the receiver/transmitter 102, thereby controlling relay of the communication between the mobile station 20 and the base station 10.

In addition, the communication controller 106 monitors the operational condition of the radio relay apparatus 30, and transmits the monitoring information to the monitoring apparatus 50 via the receiver/transmitter 102, base station 10 and the communication network 40. In doing this, in order for the monitoring apparatus 50 to identify the source of transmission of the monitoring information, the communication controller 106 appends an identification code of the radio relay apparatus 30 (apparatus identification code) to the monitoring information and transmits the monitoring information to the monitoring apparatus 50. The apparatus identification code is determined on the basis of an identification code of the base station 10 (referred to as "base station identification code" below), which is the target to be relayed to/from by the radio relay apparatus 30. The details of the process of determining the apparatus identification code are described below.

When the radio relay apparatus 30 is newly installed and its electric power is turned ON, the communication controller 106 determines the base station 10 serving as the target to be relayed to/from. Specifically, the communication controller 106 tries to receive the perch channel signals transmitted from base stations, thereby searching for base stations in the surrounding area. When the communication controller 106 succeeds in receiving the perch channel signals, it specifies each base station transmitting the perch channel signals as a candidate for the target to be relayed to/from by the radio relay apparatus 30. Furthermore, the communication controller 106 specifies one of the candidates yielding the highest level of the received signals as the base station 10, which serves as the target to be relayed to/from by the radio relay apparatus 30.

After the base station 10 serving as the target of relay is determined, the communication controller 106 receives the base station identification code transmitted from the base station 10 through the receiver/transmitter 102 and stores the base station identification code in the memory 108.

Figure 2:
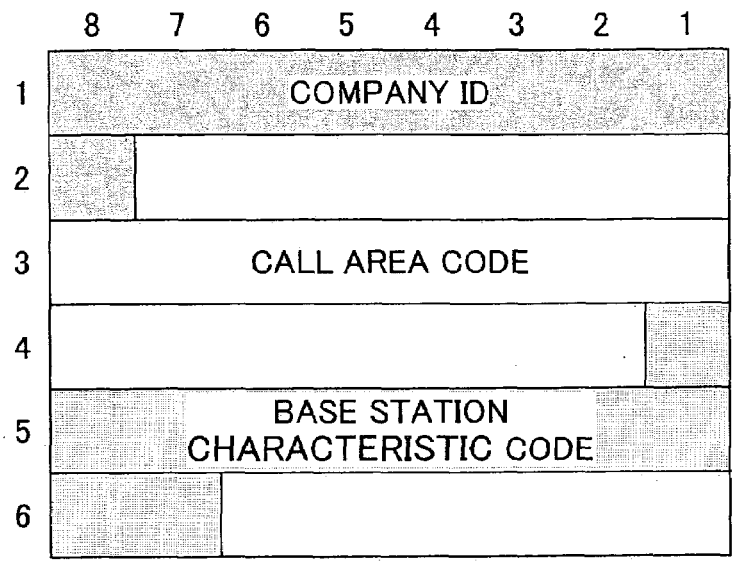
FIG. 2 is a view showing a structure of a base station identification code.

FIG. 2 is a view showing an example of a structure of the base station identification code of the base station 10. The base station identification code shown in FIG. 2 includes a 9-bit company identification code, a 16-bit call area identification code, and an 11-bit base station characteristic code.

Returning to FIG. 1, the determination unit 110 determines a temporary identification code of the radio relay apparatus 30 based on the base station identification code stored in the memory 108, and stores the temporary identification code in the memory 108. Below, the identification code of the radio relay apparatus 30 is referred to as "apparatus identification code".

Specifically, the determination unit 110 combines the company identification code and the call area identification code with a characteristic code of the radio relay apparatus 30, and uses the combined code as the above temporary apparatus identification code.

Figure 3:
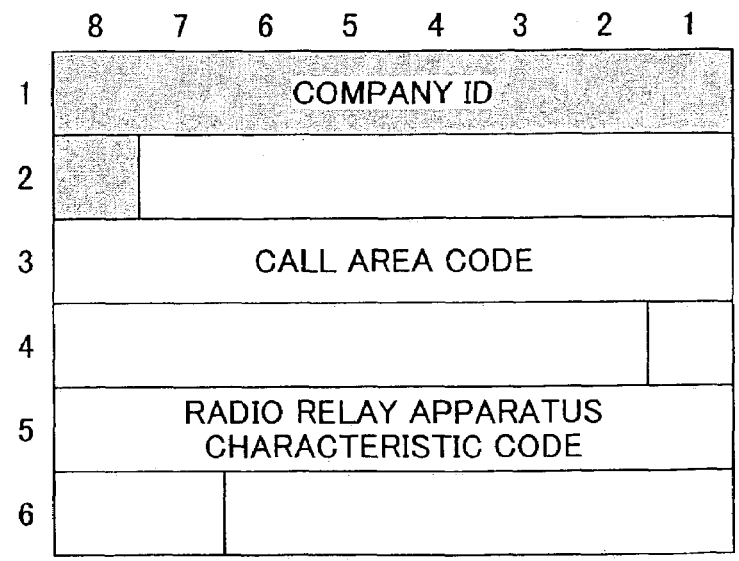
FIG. 3 is a view showing a structure of an apparatus identification code.

FIG. 3 is a view showing a structure of the apparatus identification code determined in the above way.

The apparatus identification code shown in FIG. 3 is used to uniquely determine a radio relay apparatus, including a 9-bit company identification code, a 16-bit call area identification code, and an 11-bit radio relay apparatus characteristic code. Among the above codes, the company identification code and the call area identification code are the same as the corresponding parts of the base station identification code of the base station 10, which is stored in the memory 108. The radio relay apparatus characteristic code may be stored in advance in the radio relay apparatus.

Returning to FIG. 1, the communication controller 106 starts operations using the temporary apparatus identification code as determined above. Specifically, the communication controller 106 monitors the operational condition of the radio relay apparatus 30. Further, the communication controller 106 appends the temporary apparatus identification code and the base station identification code stored in the memory 108 to the monitoring information, and transmits the monitoring information to the monitoring apparatus 50.

The receiver/transmitter 102 transmits a starting completion message including the temporary apparatus identification code stored in the memory 108 to the monitoring apparatus 50 via the base station 10 and the communication network 40.

The monitoring apparatus 50 includes a receiver/transmitter 202 and a determination unit 204 for determining the apparatus identification code of the radio relay apparatus 30. The receiver/transmitter 202 receives the starting completion message from the radio relay apparatus 30 and outputs the message to the determination unit 204.

The determination unit 204 manages all the formal (non-temporary) identification codes of the radio relay apparatuses comprising the mobile communication system. The determination unit 204 determines an apparatus identification code once a starting completion message is received. In doing this, the determination unit 204 assigns the radio relay apparatus 30 a formal apparatus identification code that is different from the formal apparatus identification codes of the other radio relay apparatuses.

Specifically, when the received temporary identification code is different from the formal identification codes of other radio relay apparatuses, the determination unit 204 transmits directly the temporary identification code to the radio relay apparatus 30; when the received temporary identification code is the same as the formal identification code of an existing radio relay apparatus, the determination unit 204 determines an identification code different from the temporary identification code and transmits the determined identification code to the radio relay apparatus 30.

Subsequently, the determination unit 204 appends the determined apparatus identification code to a responding message to the starting completion message, and transmits this responding message to the receiver/transmitter 202, and to the radio relay apparatus 30, which is the transmission source of the starting completion message, via the communication network 40 and the base station 10.

The receiver/transmitter 102 in the radio relay apparatus 30 receives the responding message to the starting completion message from the monitoring apparatus 50, and then transmits the apparatus identification code included in the responding message to the determination unit 110. The determination unit 110 identifies the input apparatus identification code as the formal identification code of the radio relay apparatus 30 (formal apparatus identification code), and stores the formal apparatus identification code in the memory 108. Further, the determination unit 110 sets a flag to one, which is indicative of the fact that the formal apparatus identification code is received. This flag is referred to as "reception flag" below.

The communication controller 106 continues operations using the formal apparatus identification code. Specifically, the communication controller 106 monitors the operational condition of the radio relay apparatus 30. Further, when transmitting the monitoring information to the monitoring apparatus 50, the communication controller 106 confirms whether the reception flag is set to one, and if the reception flag is set to one, the communication controller 106 appends the formal apparatus identification code stored in the memory 108 to the monitoring information, and transmits the monitoring information to the monitoring apparatus 50.

Above, the operations of a newly installed radio relay apparatus 30 for determining its identification code is described.

In other cases, for example, when problems occur in the base station 10, or a base station is newly installed, the target of relay of a radio relay apparatus in usual operations, which has a specified identification code, may change. In this case, the apparatus identification code may also be changed, and it can be determined in the following way.

When the communication controller 106 detects that the radio relay apparatus 30 is out of synchronization with the base station 10 serving as the target of relay, the communication controller 106 determines a new base station 10 to be the new target of relay. Specifically, the communication controller 106 tries to receive the perch channel signals transmitted from base stations, thereby searching for base stations in the surrounding area. When the communication controller 106 succeeds in receiving the perch channel signals, it specifies each base station transmitting the received perch channel signals as a candidate of the target to be relayed to/from by the radio relay apparatus 30.

When the modification determination unit 112, via the receiver/transmitter 102, receives the base station identification codes transmitted from one or numerous base stations, which are determined to be candidates of the target to be relayed to/from by the radio relay apparatus 30, the modification determination unit 112 determines whether there is a base station identification code, which includes the same company identification code and the same call area identification code as those included in the formal apparatus identification code stored in the memory 108, among the base station identification codes from the one or numerous base stations specified as candidates for target of relay.

If it is found that there exists a base station identification code including the same company identification code and the same call area identification code as those included in the formal apparatus identification code stored in the memory 108, the modification determination unit 112 decides that it is not necessary to modify the formal apparatus identification code. In this case, the communication controller 106 continues to use the formal apparatus identification code stored in the memory 108 and starts to operate.

If it is found that there is not a base station identification code including the same company identification code and the same call area identification code as those included in the formal apparatus identification code stored in the memory 108, the modification determination unit 112 decides that it is necessary to modify the formal apparatus identification code. In this case, the modification determination unit 112 sets the reception flag to zero.

After setting the reception flag to zero, the communication controller 106 determines a base station 10 to be the target to be relayed to/from, and stores the base station identification code transmitted from this base station 10 in the memory 108. Then, the determination unit 110 determines the temporary apparatus identification code based on the base station identification code stored in the memory 108, and stores the determined temporary apparatus identification code in the memory 108. Further, the receiver/transmitter 102 transmits the starting completion message including the temporary apparatus identification code stored in the memory 108 to the monitoring apparatus 50 via the base station 10 and the communication network 40, and the communication controller 106 starts operations with the temporary apparatus identification code.

Subsequently, after receiving the responding message to the starting completion message from the monitoring apparatus 50, the receiver/transmitter 102 transmits the apparatus identification code included in the responding message to the determination unit 110. The determination unit 110 specifies the input apparatus identification code as the formal apparatus identification code of the radio relay apparatus 30, and stores the formal apparatus identification code in the memory 108, and further sets the reception flag to one. Then the communication controller 106 continues operations using the formal apparatus identification code.

Next, the operations of the radio relay apparatus 30 for determining the formal identification code thereof are described in connection to flowcharts shown in FIG. 4 through FIG. 6.

Figure 4:
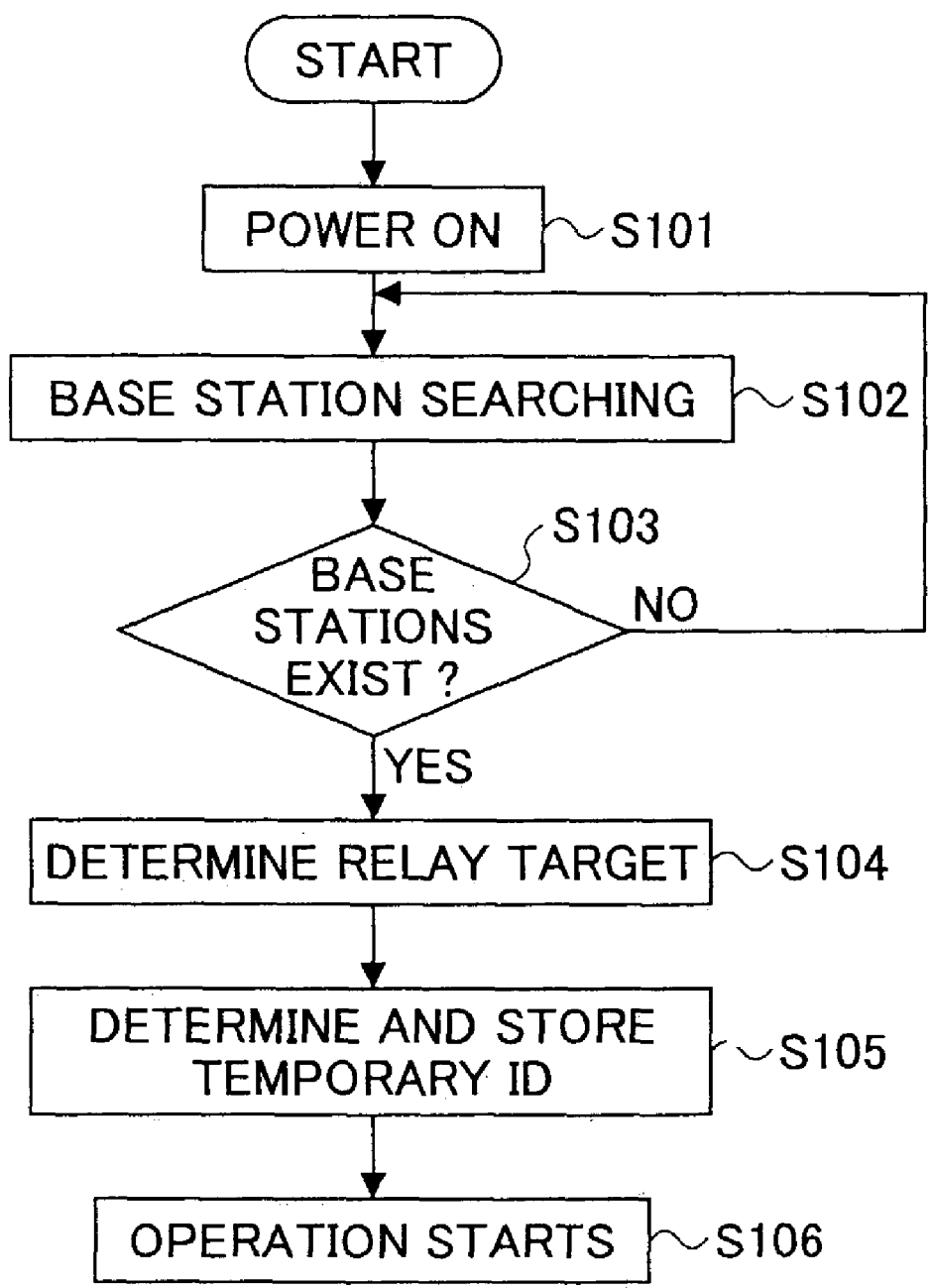

FIG. 4 is a flow chart showing the operation of the radio relay apparatus 30 when the radio relay apparatus 30 is newly installed and its power is turned ON.

As shown in FIG. 4, in step S101, the power of the radio relay apparatus 30 is turned ON.

In step S102, the radio relay apparatus 30 searches for base stations in the surrounding area.

In step S103, the radio relay apparatus 30 determines whether base stations exist in the surrounding area.

In step S104, if base stations exist in the surrounding area, the radio relay apparatus 30 specifies the base station yielding the highest level of the received signals (for example, perch channel signals) to be the base station 10, which serves as the target to be relayed to/from by the radio relay apparatus 30.

In step S105, after the base station 10 serving as the target of relay is determined, the radio relay apparatus 30 receives the base station identification code transmitted from the base station 10, and determines a temporary apparatus identification code including the company identification code, the call area identification code, and the radio relay apparatus characteristic code, and stores the temporary apparatus identification code in the memory 108.

In step S106, the radio relay apparatus 30 starts to operate using the temporary apparatus identification code.

Figure 5:
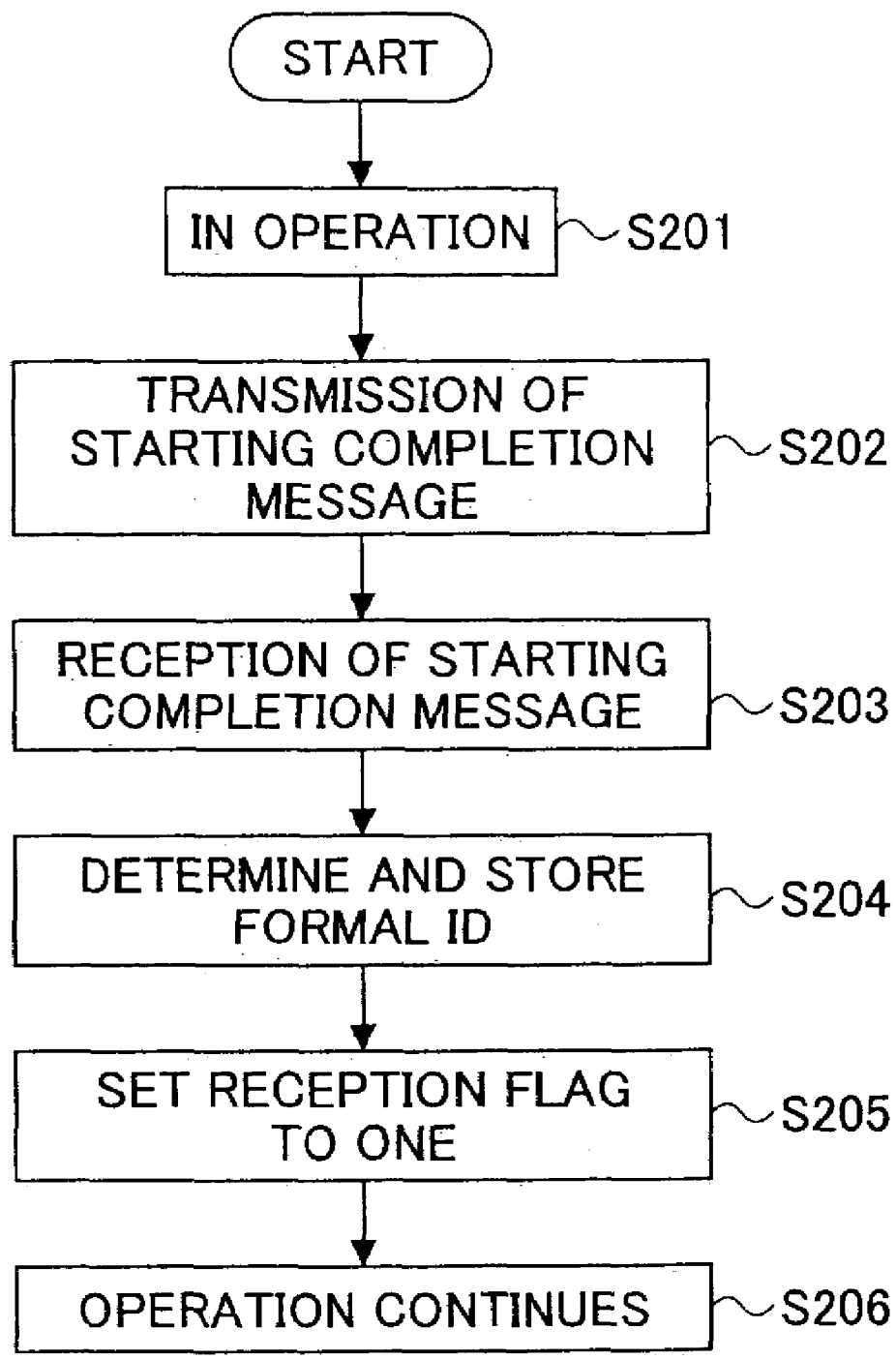
FIG. 5 is a flow chart showing the operation of the radio relay apparatus after starting operations.

FIG. 5 is a flow chart showing the operation of the radio relay apparatus 30 after it starts to operate.

As shown in FIG. 5, in step S201, the radio relay apparatus 30 starts to operate.

In step S202, the radio relay apparatus 30 appends the temporary apparatus identification code to the monitoring information, and transmits the monitoring information to the monitoring apparatus 50.

Upon receiving the starting completion message from the radio relay apparatus 30, the monitoring apparatus 50 determines the apparatus identification code of the radio relay apparatus 30. Furthermore, the monitoring apparatus 50 appends the determined apparatus identification code to the responding message to the starting completion message, and transmits this responding message to the radio relay apparatus 30.

In step S203, the radio relay apparatus 30 receives the responding message to the starting completion message from the monitoring apparatus 50.

In step S204, the radio relay apparatus 30 determines the apparatus identification code included in the responding message to be the formal apparatus identification code, and stores the formal apparatus identification code in the memory 108.

In step S205, the radio relay apparatus 30 sets the reception flag to one.

In step S206, the radio relay apparatus 30 continues operations using the formal apparatus identification code.

Figure 6:
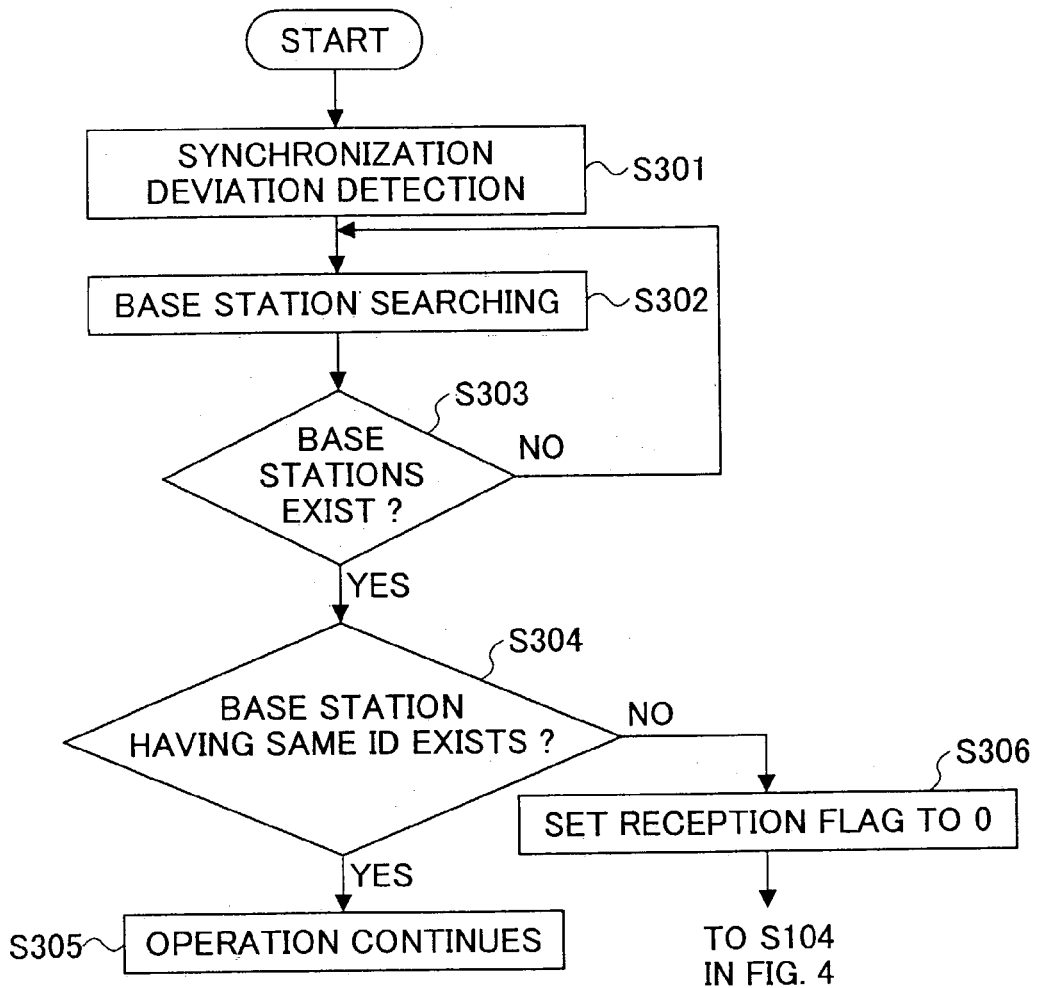

FIG. 6 is a flow chart showing the operation of the radio relay apparatus 30 when it is out of synchronization with the base station 10 serving as the target of relay.

As shown in FIG. 6, in step S301, the radio relay apparatus 30 detects that the radio relay apparatus 30 is out of synchronization with the base station 10 serving as the target of relay.

In step S302, when the synchronization deviation is detected, the radio relay apparatus 30 searches for base stations in the surrounding area.

In step S303, the radio relay apparatus 30 determines whether base stations exist in the surrounding area.

In step S304, if base stations exist in the surrounding area, the radio relay apparatus 30 determines whether there exists a base station identification code including the same company identification code and the same call area identification code as those included in the formal apparatus identification code stored in the memory 108 among the base station identification codes from the surrounding base stations.

In step S305, if there exists a base station identification code including the same company identification code and the same call area identification code as those included in the formal apparatus identification code stored in the memory 108 (YES at S304), the radio relay apparatus 30 decides that it is not necessary to modify the formal apparatus identification code. In this case, the radio relay apparatus 30 continues to use the formal apparatus identification code stored in the memory 108 for operations.

In step S306, if there is not a base station identification code including the same company identification code and the same call area identification code as those included in the formal apparatus identification code stored in the memory 108 (NO at S304), the radio relay apparatus 30 decides that it is necessary to modify the formal apparatus identification code. In this case, the radio relay apparatus 30 sets the reception flag to be zero.

After setting the reception flag to zero, the operations from step 104 in FIG. 4 (that is, determination of the base station 10 serving as the target to be relayed) are repeated.

As shown above, in the mobile communication system according to the present embodiment, the radio relay apparatus 30 receives the base station identification code from the base station 10 serving as a target of relay, determines the temporary apparatus identification code of the radio relay apparatus 30 on the basis of the base station identification code, and transmits the temporary apparatus identification code to the monitoring apparatus 50. When an apparatus identification code is received from the monitoring apparatus 50, the radio relay apparatus 30 specifies the received apparatus identification code as the formal identification code of the radio relay apparatus. In this way, the maintainer does not need to perform cumbersome operations as done in the related art, and the time required for starting operation of the radio relay apparatus 30 can be shortened, and radio communication areas can be formed quickly.

In addition, when the formal apparatus identification code is modified, the radio relay apparatus 30 transmits a new temporary apparatus identification code to the monitoring apparatus 50 immediately, and the monitoring apparatus 50 transmits an apparatus identification code, which is to be used as the new formal apparatus identification code, to the radio relay apparatus 30. Hence, the formal apparatus identification code used by the radio relay apparatus 30 and the monitoring apparatus 50 can be determined quickly, and therefore the time for adjusting can be shorten, and the monitoring apparatus 50 is able to properly perform monitoring.

Furthermore, even if the radio relay apparatus 30 and the base station 10 is not in synchronization, if there exists a base station identification code including the same company identification code and the same call area identification code as those included in the formal apparatus identification code stored in the memory 108 among the received base station identification codes, it is not necessary to modify the formal apparatus identification code. Hence, it is not necessary to determine the temporary apparatus identification code or modify the formal apparatus identification code. As a result, the number of modifications of the formal apparatus identification code can be reduced to be as small as possible, thereby reducing the workload of processing.

Further, by including a code characteristic of the radio relay apparatus 30 in the temporary apparatus identification code, the monitoring apparatus 50 is able to make the temporary apparatus identification codes before and after the modification correlate with each other, thereby preventing errors when identifying the radio relay apparatus 30.

While the present invention has been described with reference to specific embodiments chosen for purpose of illustration, it should be apparent that the invention is not limited to these embodiments, but numerous modifications could be made thereto by those skilled in the art without departing from the basic concept and scope of the invention.

Summarizing the effect of the invention, the radio relay apparatus receives an identification code from the base station serving as a target of relay, determines a first identification code used as a temporary identification code of the radio relay apparatus on the basis of the identification code of the base station and transmits the temporary identification code to the monitoring apparatus. When the radio relay apparatus receives the identification code transmitted from the monitoring apparatus, the radio relay apparatus uses the received identification code to be a formal identification code of the radio relay apparatus. Hence, the maintainer does not need to perform cumbersome operations as done in the related art, and the time required for starting operation of the radio relay apparatus can be shortened, and radio communication areas can be formed quickly.

This patent application is based on Japanese priority patent application No. 2002-212881 filed on Jul. 22, 2002, the entire contents of which are hereby incorporated by reference.

What is claimed is:

1. A radio relay apparatus for relaying communications between a base station and a mobile station and transmitting monitoring information including a formal identification code thereof to a monitoring apparatus in a mobile communication system, comprising:
a determination unit configured to determine a first identification code used as a temporary identification code of the radio relay apparatus, said first identification code being determined in conjunction with an identification code of the base station that serves as a target to be relayed to/from by the radio relay apparatus; and
a receiver configured to receive a second identification code determined by the monitoring apparatus, said monitoring apparatus determining the second identification code based on the first identification code, said second identification code being determined to be different from identification codes of other radio relay apparatuses,
wherein
the second identification code is used as the formal identification code of the radio relay apparatus.

2. The radio relay apparatus as claimed in claim 1, wherein
the determination unit combines a part of the identification code of the base station and a characteristic code of the radio relay apparatus, and uses the combined code as the first identification code.

3. The radio relay apparatus as claimed in claim 1, further comprising a modification determination unit configured to determine whether the formal identification code of the radio relay apparatus needs to be modified,
wherein
when the modification determination unit determines that the formal identification code of the radio relay apparatus needs to be modified, the determination unit determines the first identification code used as the temporary identification code of the radio relay apparatus on the basis of an identification code of another base station.

4. The radio relay apparatus as claimed in claim 1, further comprising a transmitter configured to transmit the monitoring information including the formal identification code of the radio relay apparatus to the monitoring apparatus.

5. A monitoring apparatus for monitoring a mobile communication system including a base station, a mobile station, and a radio relay apparatus for relaying communications between the base station and the mobile station, comprising:
a receiver configured to receive a first identification code from the radio relay apparatus used as a temporary identification code of the radio relay apparatus;
a determination unit configured to determine a second identification code used as a formal identification code of the radio relay apparatus; and
a transmitter configured to transmit the formal identification code to the radio relay apparatus.

6. The monitoring apparatus as claimed in claim 5, wherein the determination unit determines the second identification code that is different from formal identification codes of any other radio relay apparatuses.

7. A method of determining a formal identification code of a radio relay apparatus in a mobile communication system including the radio relay apparatus for relaying communications between a base station and a mobile station, and a monitoring apparatus for monitoring the mobile communication system by using monitoring information including the formal identification code of the radio relay apparatus, comprising the steps of:
determining, by the radio relay apparatus, a first identification code used as a temporary identification code of the radio relay apparatus in conjunction with an identification code of the base station serving as a target to be relayed to/from; and determining, by the monitoring apparatus, a second identification code based on the first identification code, said second identification code being determined to be different from formal identification codes of other radio relay apparatuses, and the radio relay apparatus using the second identification code as the formal identification code thereof.

* * * * *